UNITED STATES PATENT OFFICE.

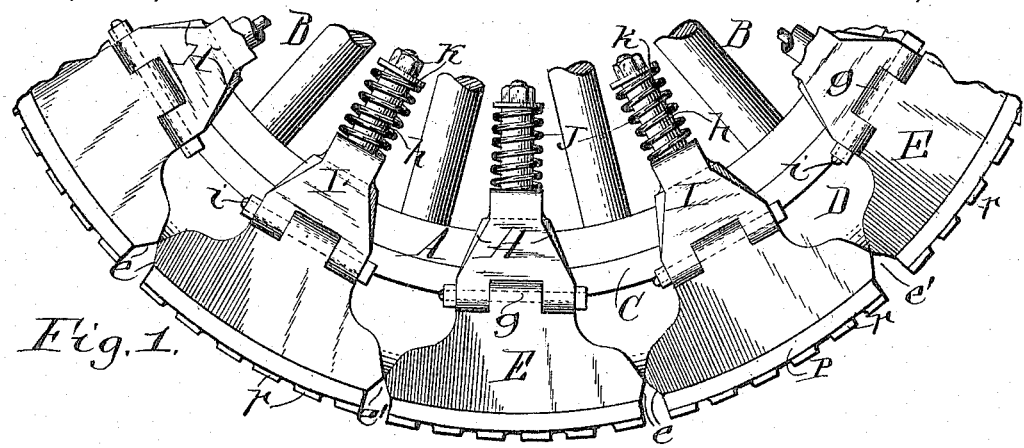
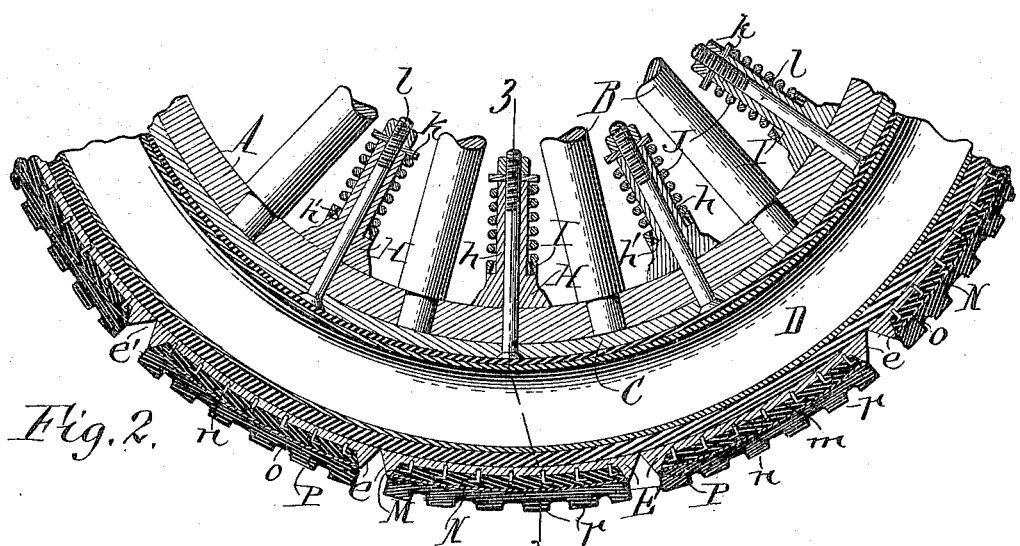
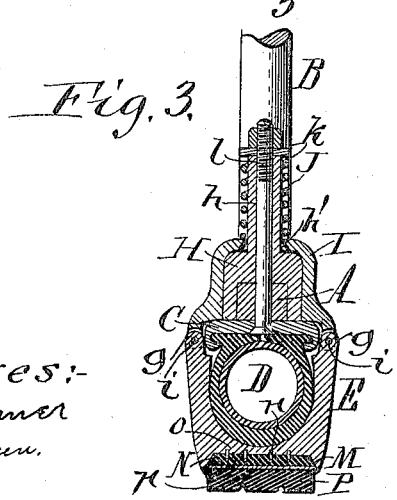

JASON RICHARDSON, OF BUFFALO, NEW YORK.

TIRE-PROTECTOR.

1,158,075.　　　Specification of Letters Patent.　　Patented Oct. 26, 1915.

Application filed May 17, 1910. Serial No. 561,912.

*To all whom it may concern:*

Be it known that I, JASON RICHARDSON, a citizen of the United States, residing at Buffalo, in the county of Erie and State of New York, have invented new and useful Improvements in Tire-Protectors, of which the following is a specification.

This invention relates to an improved protector which is more particularly designed for use on pneumatic tires although the same may also be used on solid tires for preventing skidding during wet or slippery weather.

The object of this invention is to provide a tire protector which will effectually cover the entire surface of the tire without interfering with the resiliency of the same and on which the wearing face can be readily and cheaply renewed without necessitating renewal of the entire protector.

In the accompanying drawings: Figure 1 is a fragmentary side elevation of a tired wheel equipped with my improved protector. Fig. 2 is a longitudinal section of the same. Fig. 3 is a transverse section in line 3—3, Fig. 1.

Similar letters of reference indicate corresponding parts throughout the several views.

The wheel shown in the drawings for illustrating my invention comprises a felly A, spokes B connected with the inner side of the felly, a rim C surrounding the felly, and a pneumatic tire D arranged in the channel of the rim.

In its general organization my improved tire protector comprises a plurality of sections which are arranged in a circumferential row around the tread of the tire. Each of these sections comprises a segmental shoe E preferably constructed of metal and of crescent shaped form in cross section, so that it fits the tread of the tire. Centrally on its opposite longitudinal edges the shoe is provided with inwardly projecting eyes $g$.

H represents a plurality of saddles each of which straddles the inner side of the felly and is provided with an inwardly projecting guide post or stem $h$.

I represents a plurality of yokes each of which straddles one of the saddles and is detachably connected at its opposite outer ends with the eyes of one of the shoes by bolts $i$ or similar fastenings. At its central part or crown the yoke is provided with an opening $h^1$ which receives the post $h$ of the adjacent saddle and compels these parts to turn with the wheel but permits the shoe and yoke to move radially during the operation of the wheel. The opening in each yoke which receives a post $h$ preferably flares outwardly and is elongated transversely so as to permit a limited rocking movement of the yoke on the post when the wheel is running over an uneven road.

The shoes and yokes may be yieldingly held in their outermost position solely by the resilience of the pneumatic tire but if desired the resilience of the tire may be augmented by means of springs J one of which is applied to each guide post and bears at its outer end against the adjacent yoke while its inner end bears against a shoulder $k$ formed on the inner end of the adjacent post by a washer secured thereto. Each washer, guide post and saddle are preferably secured to the felly and rim by a bolt $l$, as shown in Figs. 2 and 3.

The transverse edges of each shoe are beveled or inclined adjacent to the outermost part of the tread of the tire, as shown at $e$, so that these edges of each shoe converge outwardly and form recesses $e^1$ between the transverse edges of adjacent shoes, the transverse sides of which diverge outwardly. By this means the several shoes can be arranged close together around the tire for fully protecting the latter and still permit the shoes to move radially without interfering with each other as the tire compresses and expands under varying loads when in use.

Each of the shoes is of rectangular form and provided on its outer side with an elastic cushion which is constructed as follows:—M represents a marginal flange or rim arranged on the under or outerside of each shoe, thereby forming a pocket or recess $m$ on this side of the same having transverse and longitudinal walls which flare outwardly. Within this pocket is arranged an inner layer or cushion section N of elastic material such as rubber, the same being fastened in said pocket by vulcanizing and also, if desired, by means of anchors $n$ preferably of hook form permanently secured to the shoe within its pocket and embedded in the inner cushion layer. These hook shaped anchors are preferably attached to the shoe by casting the latter on the anchors and the inner cushion section is preferably attached to the shoe and anchors by placing the rubber for this cushion section in the pockets in a plastic or unvulcanized condition and thereafter hardening or vulcanizing the same while on the shoe, thereby reliably connecting these parts. To the outer side of the inner cushion section a division strip *o* of canvas, woven fabric or other suitable material may be secured to this cushion section by vulcanizing or in any other suitable manner. The combined thickness of the inner cushion section and division strip is preferably such that the division strip is flush with the outer edge of the flange on the outer side of the shoe, as shown in Figs. 2 and 3.

On the outer side of the division strip is arranged an outer cushion section P of rubber or similar material which is secured to the strip preferably by vulcanizing. This outer cushion section is provided on its outer side with spurs or projections *p* which are formed integrally with the outer cushion section and increase the traction of the protector section as well as preventing skidding in slippery weather.

Whenever the outer cushion section has become bodily-worn, the same may be ripped off the division strip and replaced by a new outer cushion section. By this means the cushion can be readily repaired without necessitating renewal of the entire cushion, thereby effecting a considerable reduction in the expense of maintaining the protector in the good working condtion.

In practice a supply of outer cushion sections may be kept on hand thus enabling repairs of the cushions to be made quickly, thereby avoiding the loss of time which heretofore was necessary when repairing tires of the ordinary construction.

By constructing each shoe of rectangular form and providing the same with a pocket on its outer side having transverse and longitudinal walls which flare outwardly, the pressure which is exerted upon the inner permanent layer within the pocket constantly tends to tighten the same instead of loosening it thereby enabling the inner layer to always remain securely attached to the shoe and only necessitating renewing the outer layer from time to time when the latter becomes worn.

I claim as my invention:

A tire protector comprising a rectangular shoe adapted to be applied to the tread of a tire and provided on its outerside with an outwardly opening pocket having transverse and longitudinal walls which flare outwardly and a plurality of anchoring hooks arranged on the bottom of said pocket and terminating short of the outerside of said shoe, an inner permanent rubber layer arranged in said pocket and having its outer face terminating short of the outer side of said shoe and interlocked with said hooks, and an outer renewable rubber layer secured detachably to the inner permanent layer, said shoe being cast on said anchors for connecting the same.

Witness my hand this 14th day of May, 1910.

JASON RICHARDSON.

Witnesses:
THEO. L. POPP,
E. M. GRAHAM.

Copies of this patent may be obtained for five cents each, by addressing the " Commissioner of Patents, Washington, D. C."